United States Patent
Rosu et al.

(10) Patent No.: US 12,452,052 B2
(45) Date of Patent: Oct. 21, 2025

(54) REMOTE CONTROLLED HARDWARE SECURITY MODULE

(71) Applicant: Google LLC, Mountain View, CA (US)

(72) Inventors: Marcel Catalin Rosu, Mount Kisco, NY (US); Timothy Matthew Dierks, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 251 days.

(21) Appl. No.: 18/188,674

(22) Filed: Mar. 23, 2023

(65) Prior Publication Data

US 2024/0323010 A1 Sep. 26, 2024

(51) Int. Cl.
*H04L 9/08* (2006.01)
*H04L 9/32* (2006.01)

(52) U.S. Cl.
CPC .......... *H04L 9/0877* (2013.01); *H04L 9/0825* (2013.01); *H04L 9/3263* (2013.01)

(58) Field of Classification Search
CPC .... H04L 9/0877; H04L 9/0825; H04L 9/3263
See application file for complete search history.

(56) References Cited

U.S. PATENT DOCUMENTS

| | | | |
|---|---|---|---|
| 8,694,781 B1 | 4/2014 | Griffin et al. | |
| 11,218,485 B1* | 1/2022 | Delaney | G06F 21/53 |
| 2008/0022391 A1* | 1/2008 | Sax | H04L 12/4679 726/15 |
| 2012/0084562 A1* | 4/2012 | Farina | G06F 21/575 713/168 |
| 2013/0179676 A1 | 7/2013 | Hamid | |
| 2016/0028551 A1 | 1/2016 | Hussain et al. | |
| 2018/0152448 A1* | 5/2018 | Fitzgerald | H04L 67/125 |
| 2019/0028281 A1* | 1/2019 | Turissini | G06F 21/57 |
| 2020/0089916 A1 | 3/2020 | Buendgen | |
| 2020/0364319 A1* | 11/2020 | Hunt | H04L 9/14 |
| 2021/0111885 A1* | 4/2021 | Kubovcik | H04L 9/0825 |
| 2021/0281553 A1* | 9/2021 | Ward | G06F 21/53 |
| 2021/0406404 A1* | 12/2021 | Moran | H04L 9/3236 |
| 2022/0391856 A1* | 12/2022 | Anumulapally | G06F 21/602 |
| 2023/0026420 A1* | 1/2023 | Ward | H04L 63/08 |
| 2024/0184896 A1* | 6/2024 | Anumulapally | H04L 63/0485 |
| 2024/0214185 A1* | 6/2024 | Li | H04L 9/083 |

OTHER PUBLICATIONS

Foscari, "A Formally Verified Configuration for Hardware Security Modules in the Cloud", arXiv:2109.13631v1, Sep. 28, 2021, 17 pages.

* cited by examiner

*Primary Examiner* — Techane Gergiso
(74) *Attorney, Agent, or Firm* — DORITY & MANNING P.A.

(57) ABSTRACT

Provided are computer systems and methods that enable the remote control of a hardware security module (HSM) device. In particular, aspects of the present disclosure enable HSM device management to be split into two components: physical management, which can be handled by a cloud provider or other IT service provider; and logical management, which can be performed by the HSM end user. Thus, a user computing system can be enabled to remotely control a HSM device that is installed in a server computing system that is remotely located from the user computing system.

19 Claims, 3 Drawing Sheets

REMOTE CONTROLLED HARDWARE SECURITY MODULE

FIELD

The present disclosure relates generally to hardware security modules. In particular, the present disclosure relates to enabling remote control of a hardware security module.

BACKGROUND

Hardware security modules ("HSMs") are physical devices that can be used to securely store cryptographic keys and perform cryptographic operations on various inputs using the stored cryptographic keys. Various computer systems or applications can use HSM devices for critical tasks, such as generating digital signatures or decrypting data in a secure manner.

Most HSM devices come as stand-alone network-connected devices or plug-in cards. HSM devices often include tamper evidence, react, or protect mechanisms against physical attacks. The cryptographic keys used by HSMs are either generated by the device or imported from external sources. Except for the root secrets, all the imported cryptographic material, user keys included, are typically encrypted with the root secrets already inside the HSM device. Typically, the root secrets for the HSM device are imported or installed during initial provisioning of the HSM device, which is done in a secure environment under the supervision of several independent individuals.

HSM root secrets, which typically include a certificate signed by the vendor of the HSM, attest to the identity and origin of the HSM device, and therefore attest to the compliance of the HSM device with a certified security policy. The security policy usually is a public domain document that is made available by a certification authority, which is typically a trusted third party such as a governmental entity, an industry-specific global forum, or a global association of national certification authorities.

User trust in an HSM device is rooted in the trust placed on the manufacturer and distributor of the HSM device and in the third-party certification authority and their certification process. A digital HSM certificate is stored in a memory of the HSM device and can be "connected" or linked to a publicly available vendor certification issued by the certification authority for the HSM device. These two certificates can be linked by device name, device model, device version, and vendor name, which should be the same in both certificates. The digital HSM certificate is digitally signed by the vendor, which guarantees the certificate's origin and its association with the device.

In on-premises situations, the HSM users, the HSM owner, and the HSM manager are often the same entity. Applications that use the HSM device may also be owned by this entity and the entity may own or rent the physical location where the applications are run and/or where the HSM device is installed. In contrast, in settings that leverage large-scale information technology ("IT") outsourcing, the users of the HSM device (e.g., applications owned or operated by the outsourcing users) are different from the manager of the IT infrastructure that includes the HSM device. Transitioning the applications to the cloud further shifts control of the applications and ownership of the infrastructure to the cloud provider. For example, cloud providers can manage the identity and access control systems for implementing the applications and HSM devices. Thus, in certain existing settings, the end user of the HSM device may have no ability to control the HSM, and instead may be required to trust and rely upon an IT service provider to correctly control the HSM device.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for enabling remote control of a hardware security module device. The method includes processing, at a hardware security module device physically installed in a server computing system, an access request to the hardware security module device for a user computing system that is remotely located from the server computing system, wherein the access request comprises a user credential of the user computing system. The method includes verifying, at the hardware security module device, that the user computing system is permitted to control the hardware security module device based on the user credential. The method includes establishing, at the hardware security module device, a secure communication channel between the user computing system and the hardware security module device. The method includes receiving, at the hardware security module device and over the secure communication channel, a request to execute a command for the hardware security module device. The method includes executing, at the hardware security module device, the command for the hardware security module device.

Another example aspect of the present disclosure is directed to a hardware security module device installed at a server computing system, the hardware security module device configured to perform operations. The operations include processing, at the hardware security module device, an access request to the hardware security module device for a user computing system that is remotely located from the server computing system, wherein the access request comprises a user credential of the user computing system. The operations include verifying, at the hardware security module device, that the user computing system is permitted to control the hardware security module device based on the user credential. The operations include establishing, at the hardware security module device, a secure communication channel between the user computing system and the hardware security module device. The operations include receiving, at the hardware security module device and over the secure communication channel, a request to execute a command for the hardware security module device. The operations include executing, at the hardware security module device, the command for the hardware security module device.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
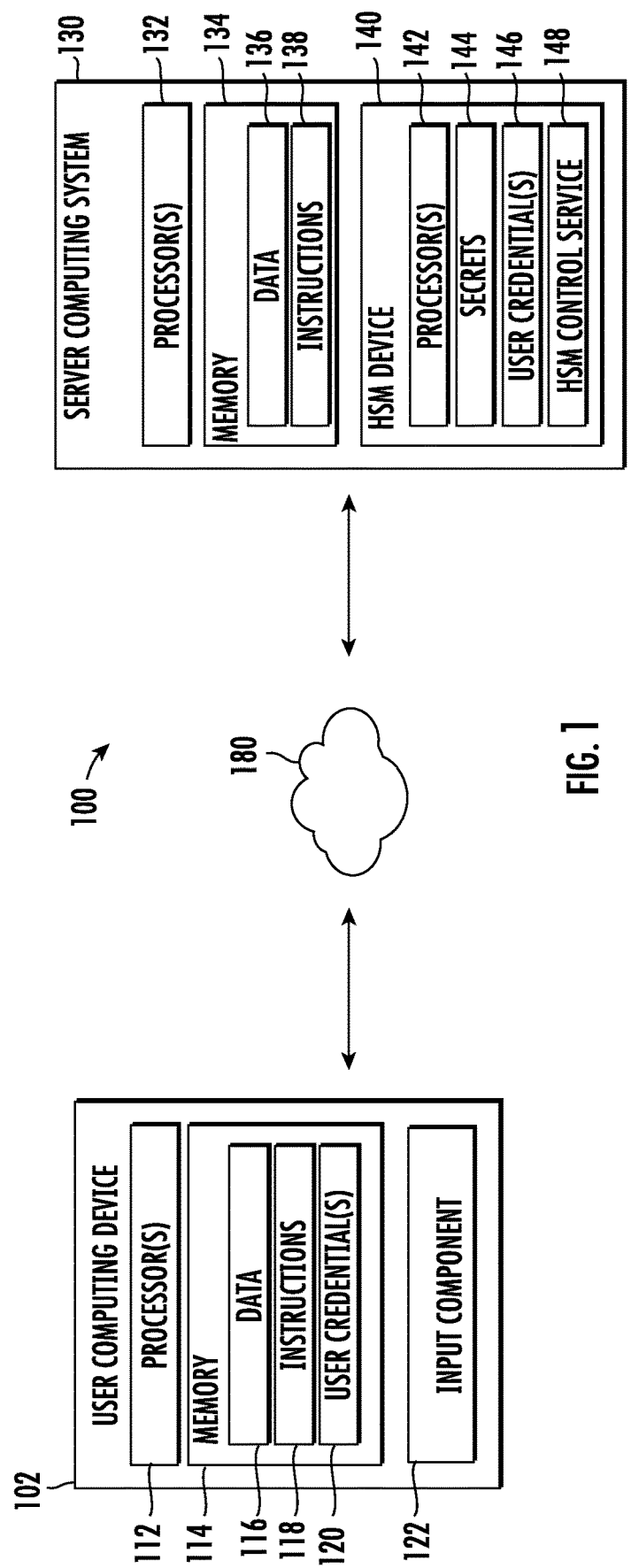
FIG. 1 depicts a block diagram of an example computing system that performs HSM device management according to example embodiments of the present disclosure.

Reference numerals that are repeated across plural figures are intended to identify the same features in various implementations.

DETAILED DESCRIPTION

Generally, the present disclosure is directed to computer systems and methods that enable the remote control of a hardware security module (HSM) device. In particular, aspects of the present disclosure enable HSM device management to be split into two components: physical management, which can be handled by a cloud provider or other IT service provider; and logical management, which can be performed by a user computing system associated with the HSM end user (e.g., exclusively by such system). Thus, a user computing system can be enabled to remotely control a HSM device that is installed in a server computing system that is remotely located from the user computing system.

Specifically, physical management of the HSM device can include rack installation, powering the HSM device on and off, controlling environmental parameters of the HSM devices such as supply voltage and ambient temperature, and the like. These aspects can be handled by a cloud provider or other IT service provider. On the other hand, logical management of the HSM can include the provisioning of HSM control and subsequent management or control of the HSM device computational operations (e.g., use of the HSM device for cryptographic functions, etc.).

In particular, provisioning of the HSM can occur initially prior to installation by the IT service provider. Provisioning of the HSM can be implemented by installation of a user certificate including credentials and/or coordinates of a user-owned network access point on the HSM device. For example, before the HSM device is installed in the data center, the HSM device can be sent to a secure user location where user credentials are generated and installed. Provisioning the HSM in this manner allows the user computing system to verify the HSM device (and vice versa) being used for functionality.

Provisioning of the HSM can also occur remotely and/or on an on-going basis. For example, once a credentialed user (e.g., the end user computing system) has appropriately established control over the HSM, new credentials can be installed onto the HSM device remotely. The ability to control the HSM can therefore be remotely and dynamically modified if permitted by the HSM security policy. For example, the generation and installation of credentials can be performed every time the owner of the HSM device changes.

Once the HSM has been installed at the server computing system, remote logical management of the HSM can be facilitated by establishing, on the HSM, a mutually authenticated secure channel with the user computing system, which may be on-site with the user. The mutually authenticated secure channel can be established using the user credentials and coordinates that are installed on the HSM. This mutually authenticated secure channel can be used exclusively by the user computing system to activate the HSM device and issue certain HSM management operation commands that cannot be performed outside the mutually authenticated secure channel. Thus, the HSM may be controlled only by the credentialed user system and not other components of the server computing system.

According to another aspect, the cloud provider can provide the HSM device as either a physical device or a virtual device. For example, the physical device can be a single physical device or card. The virtual device can be a logical partition of a physical HSM device into two or more virtual HSMs. Thus, in some examples, different logical partitions on an HSM device can be respectively allocated to and exclusively controlled by different user computing systems associated with different end users.

Thus, the present disclosure improves the ability of an end user to remotely control the HSM device, including, in some implementations, enabling the end user to perform remote provisioning of the HSM device. Specifically, the proposed techniques enable users (e.g., cloud customers) to retain complete and potentially exclusive control of the HSM devices used by various applications (e.g., applications owned by the customer but operated by the cloud provider). This allows cloud customers to maintain high trust in the security of the HSM device despite the fact that the HSM device is physically managed by the cloud provider and is not present on-premises of the customer. Furthermore, this secure method of managing HSM devices helps to prevent rogue elements, such as potential system hackers of the cloud provider, from performing critical and private HSM device functionality, such as running critical applications for their own benefit. That is, because control of the HSM may be exclusively granted to the user computing system having user credentials installed on the HSM, even if the server computing system at large suffers a security breach, the HSM itself will remain secure.

With reference now to the Figures, example implementations of the present disclosure will be discussed in further detail.

FIG. 1 depicts a block diagram of an example computing system 100 that manages HSM devices according to example embodiments of the present disclosure. The system 100 includes a user computing device 102 and a server computing system 130. The user computing device 102 may be associated with a particular user such as a particular cloud customer. The server computing system 130 can be included in or representative of a cloud computing environment. As used herein, the term "cloud" or "cloud computing environment" generally refers to a network of interconnected computing devices and associated storage media which interoperate to perform computational operations such as data storage, transfer, and/or processing. In some implementations, a cloud computing environment can be implemented and managed by an IT service provider. The IT service provider can provide access to the cloud computing environment as a service to various users, who may in some circumstances be referred to as "cloud customers."

The user computing device 102 can be various types of computing device, such as, for example, a personal computing device (e.g., laptop or desktop), a mobile computing device (e.g., smartphone or tablet), a gaming console or controller, a wearable computing device (e.g., an virtual/augmented reality device, etc.), or other types of computing device. In another example, the user computing device 102 can be an application server associated with an application implemented by or providing application services to an end user. In some implementations, the user computing device 102 can be any type of computing device that can accept a mutually authenticated connection from another device and interact with a user to control the other device over the connection.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The memory 114 of the user computing device 102 can also store one or more user credentials 120. As examples, the user credentials 120 can include certificates, passwords, public or private keys, and/or the like and/or data generated using such items such as data generated by application of a public or private key. For example, user credentials 120 can include data signed or encrypted using a public or private key.

The user computing device 102 can also include one or more user input components 122 that receive user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

In some implementations, the server computing system 130 can receive data of various types from the user computing device 102 and the user computing device(s) 150 (e.g., via the network 180, etc.). For example, in some implementations, the user computing device 102 can capture user command input data and transmit the data to the server computing system 130. The server computing system 130 may receive the data (e.g., via the network 180).

In some implementations, the server computing system 130 may receive data from the user computing device(s) 102 and 150 according to various encryption scheme(s). For example, the user computing device 102 may encode data with a codec, and then transmit the encoded data to the server computing system 130. The server computing system 130 may decode the encoded data with the codec.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

According to an aspect of the present disclosure, the server computing system 130 can include or otherwise be associated with one or more hardware security module (HSM) devices. In particular, the HSM devices can take various form factors. In one example, the HSM devices can include network devices (e.g., separate from but in communication with the server computing system 130) that can be used by applications running on any of the servers accessible over the network. In another example, the HSM devices can include I/O cards (e.g., PCIe cards) that, in the vast majority of cases, are physically installed within a specific server device and used exclusively by applications running on that local host/server. In each of the above cases, applications or other devices must present the proper credentials to interact with the HSM devices. For ease of reference and illustration, FIG. 1 illustrates a single HSM device 140 illustrated as included within the server computing system 130. However, despite this simplified illustration, it should be understood that if the server computing system 130 is a single computing system, the HSM device 140 can be physically outside of the server computing system 130 (e.g., the HSM device 140 has the network device form factor) or physically inside the server computing system 130 (e.g., the HSM device 140 has the PCIe card form factor). Likewise, if the server computing system 130 is a cluster of server devices, then the HSM device 140 can be both outside all of these servers or inside of each or some of them. Further, although a single HSM device 140 is illustrated, any number of HSM devices can be present within the system.

The HSM device 140 can be a general purpose HSM device, a payment HSM device, and/or any other form of HSM device. The HSM device 140 can be a stand-alone network-connected device or can be a plug-in card. In the example case in which HSM device 140 is a plug-in card (e.g., plugged into the server computing system 130), the server computing system 130 can assist in facilitating connections to and/or from the HSM device 140. For example, in some implementations the server computing system 130 can expose a network connection (e.g., IP address, port number, etc.) that the remote user connects to and sends/receives packets from. Then, for all information, data, or communications that the server computing system 130 receives on the network endpoint (e.g., typically on a TCP connection), the server computing system can forward such information, data, or communications across the I/O (e.g., PCIe) bus to the plug-in HSM device 140. Likewise, all information, data, or communications that the HSM device 140 sends to the remote user can first cross the I/O bus on the host server computing system 130 going to the local network endpoint, and from there, on the network. Thus, the host server computing system 130 of the HSM device 140 can act as a bridge, forwarding data in both directions between the plugin HSM device 140 and the remote user.

The HSM device 140 can include one or more processors 142. The one or more processors 142 can include any suitable processing device (e.g., a processor core, a microprocessor, an ASIC, an FPGA, a controller, a microcontroller, a cryptographic processor, etc.) and can be one processor or a plurality of processors that are operatively connected.

The HSM device 140 can store one or more secrets 144 (or, more generally, objects). Example secrets include passwords, certificates, or encryption or cryptographic keys. For example, HSM device 140 can store the secret(s) 144 in one or more HSM shielded locations. Each HSM shielded location can be a location within the HSM device 140 that contains data that is shielded from access by any entity other than the HSM device 140 and which may only be operated on by a protected capability.

The HSM device 140 can store a set of user credentials 146. For example, the user credentials 146 can include various security-related credentials which enable the user computing device 102 to prove its identity. For example, the user credentials 146 can include certificates, coordinates, passwords, public or private keys, and/or the like and/or data generated using such items such as data encrypted using a public or private key. As described herein, the user credentials 146 can be initially installed into the HSM device 140 at a secure user location prior to installation of the HSM device 140 at the server computing system and/or can be remotely managed (e.g., installed) by the user computing device 102 once the user computing device 102 has established control (e.g., remote control) of the HSM device 140.

The HSM device 140 can also include an HSM control service 148. The HSM control service 148 can include computer logic (e.g., embodied in computer-readable instructions) for performing operations described herein. The HSM control service 148 can be embodied in hardware, firmware, and/or software.

The HSM control service 148 may be configured to facilitate the use of (e.g., control or management of) the HSM device 140 by the user computing device 102. For example, the HSM control service 148 may receive commands from the user computing device 102 and, based on the type of connection and the identity of the user, cause the HSM device 140 to execute certain commands.

Specifically, the HSM control service 148 can receive requests by users to access the HSM device 140. These requests from the user computing device 102 can include the user credentials 120 that can be used to authenticate the user computing device 102 making the request as a computing system properly associated with the HSM device 140. For example, the user credentials 120 can be credentials used within a mutual authentication or two-way authentication protocol such as, for example, Mutual TLS (mTLS). As one example, the user credentials 120 can be or include certificates, public or private keys, and/or the like and/or data generated using such items. Thus, in one example, both the user computing device 102 and the HSM device 140 have received a certificate from a certification authority. Each of the user computing device 102 and the HSM device 140 can present their respective certificate chain to the other. However, in some implementations, other than the shared certificates, the user computing device 102 and the HSM device 140 do not share other identifying information (e.g., IDs, passwords, crypto keys, or any other shared secrets).

In response to the user computing system being verified, the HSM control service 148 can establish a secure communication channel between the user computing device 102 and the HSM device 140. The secure communication channel can be encrypted and/or otherwise secured using a variety of secure communication connection security protocols, methods, techniques, and the like. The HSM control service 148 can receive commands for the HSM device 140 from the user computing device 102, such as commands to activate the HSM device 140 or HSM device management commands. Based on the received commands, the HSM control service 148 can instruct the HSM device 140 to perform various operations on behalf of the applications running on the server computing system 130.

In some embodiments, the HSM control service 148 can transmit result messages from the executed commands back to the user computing device 102, such as confirming successful activation or access to the HSM device 140, confirming that management commands were performed, providing data regarding management commands, and the like.

Figure 2:
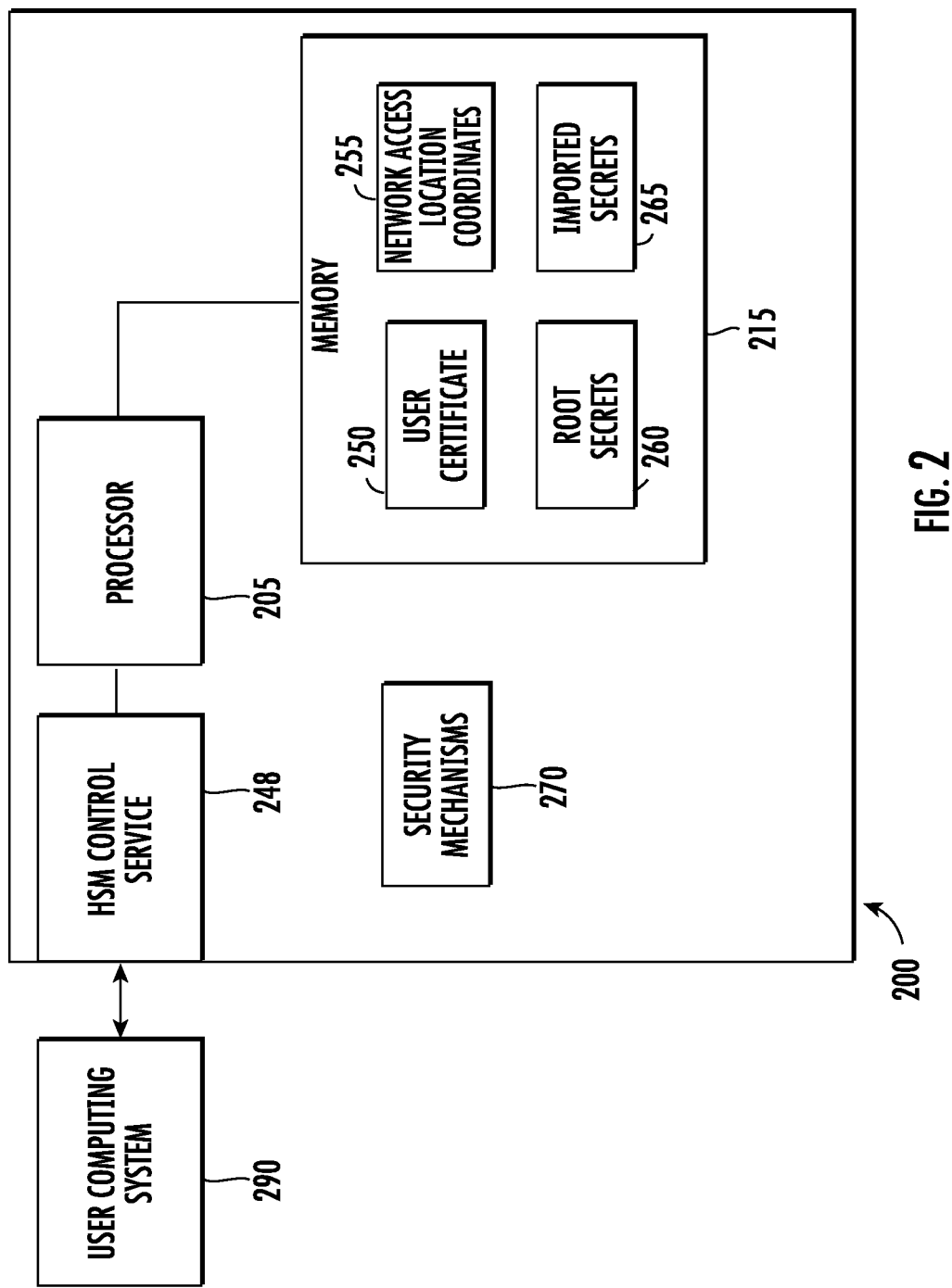
FIG. 2 depicts a block diagram of an HSM device according to example embodiments of the present disclosure.

FIG. 2 depicts a block diagram illustrating an example HSM device 200 according to example aspects of the present disclosure. The HSM device 200 can be a physical device or virtual device (e.g., a logical partition of a physical device) used to protect sensitive data, such as cryptographic keys, and to securely perform sensitive operations, such as cryptographic operations, on user input using the sensitive data. The HSM device 200 can be a stand-alone network-connected device or a plug-in card device that plugs into an input/output bus of a separate computing system.

The HSM device 200 can include one or more processors 205, an HSM control service 248, and a memory 215. The one or more processors 205 can be any suitable processing device (e.g., a processor core, a microprocessor, an ASIC, an FPGA, a controller, a microcontroller, etc.) and can be one processor or a plurality of processors that are operatively connected. The memory 215 can include one or more non-transitory computer-readable storage media, such as RAM, ROM, EEPROM, EPROM, flash memory devices, magnetic disks, etc., and combinations thereof. The memory 114 can store, among other things, data and instructions which are executed by the processor 205 to cause the HSM device 200 to perform operations.

The memory 215 can also store HSM-specific data, such as network access location coordinates 255, root secrets 260, imported secrets 265, and/or one or more digital certificates such as an HSM device certificate and a user certificate 250. A digital certificate provides a link between a public key and an entity (a business, domain name, and the like) that has been verified (e.g., signed) by a trusted third party, such as a certification authority.

The HSM device certificate can be used to prove the identity of the HSM device 200. The HSM device certificate can include the manufacturer name, model number, and/or other information that can be linked to a web accessible non-digital (e.g., written in natural language) certificate made accessible by a trusted entity (e.g., a regulator like the National Institute of Standards and Technology).

The HSM device certificate can be signed by a trusted entity and, therefore, can be trusted by another computing system that receives the HSM device certificate. The HSM device certificate can include a public key, guaranteed by the trusted signing entity to belong to the HSM device 200 described by the certificate. An HSM secret key (e.g., stored as a root secret 260) can be paired with the HSM public key and may never leave the HSM device 200. The ability to perform cryptographic operations that are only possible with the HSM secret key enables the HSM device to prove its identity.

Therefore, an initial step for a remote user of the HSM device 200 is to use the HSM device certificate to verify it is in communication with the HSM device 200. In these initial communications, the HSM device 200 may or may not require user credentials from the user computing system 290, especially if the HSM device 200 is the one that initiates the connection to the user computing system 290.

Once verified, the user computing system 290 can take ownership of the HSM device 200 and change its internal configuration. For instance, the user computing system 290 may install its own user certificate 250 and/or user secret key for the HSM device 200 to use to identify itself (e.g., on behalf of the user computing system 290) on future logins (e.g., instead of the HSM device certificate). Similar to the HSM device certificate, the user certificate 250 can be signed by a trusted entity or authority. Furthermore, in the initial login, the user computing system 290 may change the type of certificates that the HSM device 200 will be able to verify, effectively preventing anyone else other than user accounts and associated certificates from being trusted by the HSM.

Thus, the user certificate 250 can be used to prove the identity of the owner of the certificate 250. In particular, the user certificate 250 can be used in conjunction with a user secret key to determine whether a user attempting to access the HSM device 200 is permitted to control the HSM device 200 (e.g., by verifying the identity of the owner of the user certificate 250). Specifically, the user computing system 290 can initially use the user secret key to prove its identity to the HSM device 200 so as to be able to control the HSM device 200. Thereafter, the user computing system 290 can cause the user secret key to be stored by the HSM device 200 as an imported secret 265, whereby the HSM device 200 can thereafter use the user secret key and the user certificate 250 to perform operations (e.g., cryptographic operations) on behalf of the user computing system 290. The user certificate 250 can include, for example, a specific user certificate, a user digital signature, a user identification number, and other similar certificates. The user certificate 250 can be provided by the user to the manufacturer of the HSM device 200 when the HSM device 200 is provisioned (e.g., initially assembled and downloaded with firmware and other specific software and data) or can be stored on or provided to the HSM device 200 at a later time.

The network access data point coordinates 255 can identify network coordinates (e.g., one or more IP addresses, MAC addresses, and the like) from which a valid user will request to access the HSM device 200 or which the HSM device 200 will request access to before it starts operating on behalf of one or more software applications. Like the user certificate 250, the network access data point coordinates 255 can be user credentials and can be provided by the user to the manufacturer of the HSM device 200 when the HSM device 200 is provisioned.

Root secrets 260 can include a certificate signed by the HSM device 200 manufacturer or vendor which attests to the identity and origin of the HSM device 200, along with an assurance of the compliance of the HSM device 200 with a certified security policy from a certification authority. The security policy can be a public-domain document that is made available by the certification authority. The certification authority can be a trusted third party, such as a governmental entity, an industry-specific global forum, a global association of national certification authorities, and the like. Root secrets 260 can also include various cryptographic keys and other similar pieces of sensitive data. In some embodiments, root secrets 260 can be used to sign the user certificate 250 and other information, which creates a digital "chain" to publicly available vendor certificates issued by a certification authority, which links the two certificates by device name, model, and version, as well as vendor name. In some embodiments, this digital chain includes no cryptographic signatures or other operations.

Imported secrets 265 can include cryptographic keys, user keys, other cryptographic material, and other sensitive data. The imported secrets 265 can be provided by the user to the HSM device 200 manufacturer for provisioning or can be imported during operation of the HSM device 200. In some embodiments, the imported secrets 265 can be encrypted using the root secrets 260.

The HSM device 200 may also have a number of security mechanisms 270. Security mechanisms 270 can include various software and hardware components that prevent malicious actors from tampering with the HSM device 200 or at least provide evidence of tampering. For example, security mechanisms 270 can include tamper evident, tamper react, or tamper protect mechanisms against physical attacks against the HSM device 200.

The HSM control service 248 can enable remote control of the HSM device 200. Specifically, in some implementations, the HSM control service 248 can receive an access request to the HSM device 200 from or otherwise in relation to a user computing system 290 that is remotely located from the HSM device 200. The access request can include a user credential of the user computing system 290. The HSM control service 248 can verify that the user computing system 290 is permitted to control the HSM device 200 based on the provided user credential(s) (e.g., via verification of the user certificate 250 in combination with proof of possession of a corresponding private key). The HSM control service 248 can establish a secure communication channel between the user computing system 290 and the HSM device 200. The HSM control service 248 can receive, over the secure communication channel, a request to execute a command for the HSM device 200. The HSM control service 248 can cause the HSM device 200 to execute the command.

Figure 3:
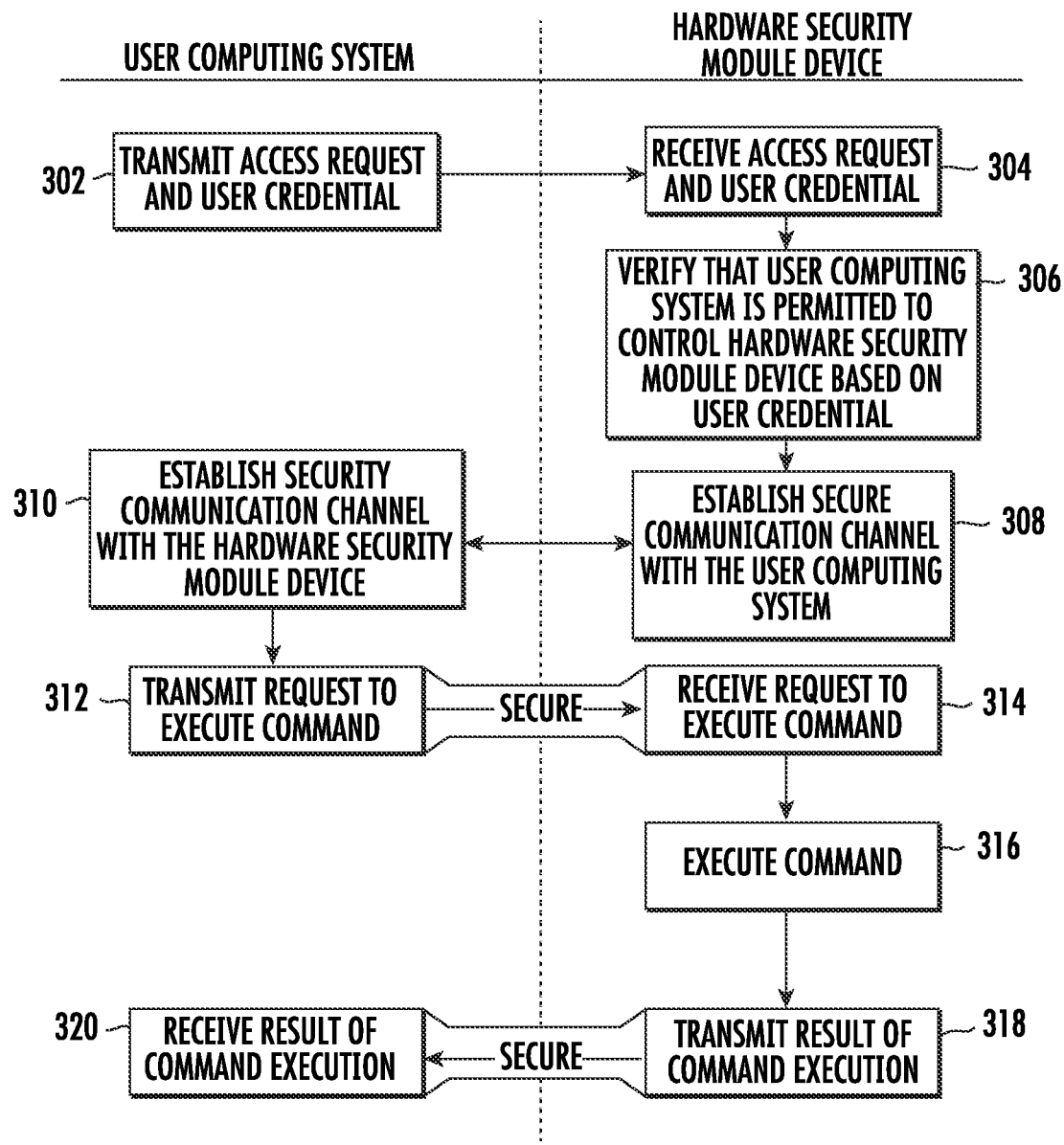
FIG. 3 depicts a swim-lane flowchart diagram of an example method to perform remote control of an HSM device according to example embodiments of the present disclosure.

FIG. 3 depicts a swim-lane flowchart diagram of an example method to perform remote control of an HSM device according to example embodiments of the present disclosure. The method is performed by a user computing system and a HSM device.

At 302, the user computing system transmits an access request to the HSM device. The access request can include a user credential. In some implementations, the user credential includes at least one user credential selected from a group of identifiers consisting of: a certificate associated with the user computing system and coordinates of a network access point of the user computing system. Although 302 shows a user computing system initiating an access request to the HSM device, this is provided as one example only. In other examples, the access requested to the HSM device may be initiated by a different system (e.g., an application server, for example, on behalf of or otherwise in association with the user computing system). Thus, the HSM device may generally process an access request for a user computing system, with the access request having been initiated by any number of different computing systems.

At 304, the HSM device receives the access request and the user credential. The access request can be a single communication or can include multiple communications which together form the access request.

At 306, the HSM device verifies that the user computing system is permitted to control the HSM device based on the user credential. In some implementations, the HSM device can verify that the user computing system is permitted to control the HSM device based on receipt of a user certificate associated with the user computing system and also based on receipt of the results of performance of one or more cryptographic operations using a user secret key. For example, the user computing system can provide the HSM device with a user certificate that includes a public key associated with the user computing system. The user computing system may also store a user secret key (e.g., "private key"). The user computing system can (privately) perform one or more cryptographic operations using the user secret key and provide the results of these operations to the HSM device. These results can prove to the HSM device that the user computing system has control of the user secret key, thereby proving its identity.

At 308, the HSM device establishes a secure communication channel with the user computing system. Likewise, at 310, the user computing system establishes the secure communication channel with the HSM device.

At 312, the user computing system transmits, over the communication channel, a request to execute the command. At 314, the HSM device receives the request to execute the command.

At 316, the HSM device executes the command. In some implementations, executing the command can include activating the hardware security module device or controlling one or more operations of the hardware security module device. In some implementations, the command can be or include a provisioning command that provisions control of the HSM device to an additional set of credentials.

At 318, the HSM device transmits, over the secure communication channel, the result of the command execution to the user computing system. At 320, the user computing system receives the result of the command execution.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for enabling remote control of a hardware security module device, the method comprising:

processing, at the hardware security module device physically installed in a server computing system, an access request to the hardware security module device for a user computing system that is remotely located from the server computing system, wherein the access request comprises a user credential of the user computing system;

verifying, at the hardware security module device, that the user computing system is permitted to control the hardware security module device based on the user credential, wherein verifying that the user computing system is permitted to control the hardware security module device comprises comparing a user certificate received from a certification authority to a certificate stored at the hardware security module device, the certificate stored at the hardware security module device being provided to the hardware security module device at a provisioning time of the hardware security module device;

establishing, at the hardware security module device, a mutually-authenticated secure communication channel between the user computing system and the hardware security module device, the mutually-authenticated secure communication channel being established based on the comparison of the user certificate to the certificate stored at the hardware security module device;

receiving, at the hardware security module device and over the mutually-authenticated secure communication channel, a request to execute a command for the hardware security module device; and executing, at the hardware security module device, the command for the hardware security module device.

2. The computer-implemented method of claim 1, wherein the user credential comprises one or more results of applying one or more cryptographic operations using a user secret key.

3. The computer-implemented method of claim 1, wherein the server computing system is prevented from controlling the hardware security module device.

4. The computer-implemented method of claim 1, wherein communications on the mutually-authenticated secure communication channel are encrypted for components of the server computing system other than the hardware security module device.

5. The computer-implemented method of claim 1, wherein executing, at the hardware security module device, the command comprises activating the hardware security module device or controlling one or more operations of the hardware security module device for one or more software applications.

6. The computer-implemented method of claim 1, wherein the command for the hardware security module device comprises a provisioning command that provisions control of the hardware security module device to an additional set of credentials.

7. The computer-implemented method of claim 1, wherein the hardware security module device is a physical hardware security module device.

8. The computer-implemented method of claim 1, wherein the hardware security module device is a virtual hardware security module device.

9. The computer-implemented method of claim 1, further comprising transmitting, by the hardware security module device and over the mutually-authenticated secure communication channel, a result of the command to the user computing system.

10. A system for enabling remote control of a hardware security module device, the system comprising:
- the hardware security module device;
- a user computing system; and
- a server computing system, Where the hardware security module device installed at a server computing system,
- the hardware security module device configured to perform operations, the operations comprising:
- processing, at the hardware security module device, an access request to the hardware security module device for the user computing system that is remotely located from the server computing system, wherein the access request comprises a user credential of the user computing system;
- verifying, at the hardware security module device, that the user computing system is permitted to control the hardware security module device based on the user credential, wherein verifying that the user computing system is permitted to control the hardware security module device comprises comparing a user certificate received from a certification authority to a certificate stored at the hardware security module device, the certificate stored at the hardware security module device being provided to the hardware security module device at a provisioning time of the hardware security module device;
- establishing, at the hardware security module device, a mutually-authenticated secure communication channel between the user computing system and the hardware security module device, the mutually-authenticated secure communication channel being established based on the comparison of the user certificate to the certificate stored at the hardware security module device;
- receiving, at the hardware security module device and over the mutually-authenticated secure communication channel, a request to execute a command for the hardware security module device; and
- executing, at the hardware security module device, the command for the hardware security module device.

11. The system of claim 10, wherein the user credential includes at least one user credential selected from a group of identifiers consisting of: a certificate associated with the user computing system and coordinates of a network access point of the user computing system.

12. The system of claim 10, wherein the user credential comprises one or more results of applying one or more cryptographic operations using a user secret key.

13. The system of claim 10, wherein the server computing system is prevented from controlling the hardware security module device.

14. The system of claim 10, wherein communications on the mutually-authenticated secure communication channel are encrypted for components of the server computing system other than the hardware security module device.

15. The system of claim 10, wherein executing, at the hardware security module device, the command comprises activating the hardware security module device or controlling one or more operations of the hardware security module device.

16. The system of claim 10, wherein the command for the hardware security module device comprises a provisioning command that provisions control of the hardware security module device to an additional set of credentials.

17. The system of claim 10, wherein the hardware security module device is a physical hardware security module device.

18. The system of claim 10, wherein the hardware security module device is a virtual hardware security module device.

19. The system of claim 10, wherein the operations further comprise transmitting, by the hardware security module device and over the mutually-authenticated secure communication channel, a result of the command to the user computing system.

* * * * *